US009036544B2

(12) United States Patent
Johansson et al.

(10) Patent No.: US 9,036,544 B2
(45) Date of Patent: May 19, 2015

(54) DELAY COMPENSATION DURING SYNCHRONIZATION IN A BASE STATION IN A CELLULAR COMMUNICATION NETWORK

(75) Inventors: Magnus Johansson, Göteborg (SE); Robert Griffioen, Ottawa (CA); Paul Bussey, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 189 days.

(21) Appl. No.: 13/281,146

(22) Filed: Oct. 25, 2011

(65) Prior Publication Data

US 2013/0100882 A1    Apr. 25, 2013

(51) Int. Cl.
*H04J 3/06*    (2006.01)
*H04W 56/00*    (2009.01)

(52) U.S. Cl.
CPC ............ *H04W 56/003* (2013.01); *H04W 56/00* (2013.01); *H04J 3/0682* (2013.01)

(58) Field of Classification Search
CPC ...................................................... H04L 12/56
USPC ............................... 370/315–390; 455/67–95
See application file for complete search history.

(56) References Cited

U.S. PATENT DOCUMENTS

| | | | |
|---|---|---|---|
| 7,571,338 B2 * | 8/2009 | Osterling et al. | 713/500 |
| 7,646,751 B2 * | 1/2010 | Osterling et al. | 370/335 |
| 7,680,095 B2 * | 3/2010 | Kawai | 370/350 |
| 7,680,149 B2 * | 3/2010 | Liu et al. | 370/466 |
| 8,335,437 B2 * | 12/2012 | Zhao et al. | 398/154 |
| 8,339,962 B2 * | 12/2012 | Racz et al. | 370/235 |
| 8,391,801 B2 * | 3/2013 | Eiza et al. | 455/67.16 |
| 8,400,965 B2 * | 3/2013 | Aoyama et al. | 370/328 |
| 8,582,494 B2 * | 11/2013 | Shimada et al. | 370/315 |
| 8,599,827 B2 * | 12/2013 | Irvine | 370/350 |
| 2007/0116046 A1 | 5/2007 | Liu et al. | |

(Continued)

FOREIGN PATENT DOCUMENTS

WO    2006040653 A1    4/2006

OTHER PUBLICATIONS

International Search Report for PCT/IB2012/055889 mailed Feb. 26, 2013, 13 pages.

(Continued)

*Primary Examiner* — Man Phan
(74) *Attorney, Agent, or Firm* — Withrow & Terranova, PLLC (57) ABSTRACT

The present disclosure relates to delay compensation during synchronization of uplink and downlink frames in a base station in a cellular communication network. In general, the base station includes a radio equipment and a radio equipment controller that together form at least part of the base station. In one embodiment, the radio equipment includes a first interface configured to receive data from the radio equipment controller and a second interface configured to send data to the radio equipment controller. During synchronization, the radio equipment receives, at the first interface of the radio equipment, a synchronization message from the radio equipment controller. The radio equipment then passes the synchronization message from the first interface of the radio equipment to the second interface of the radio equipment with a synthetic delay that is in addition to an in-equipment delay from the first interface to the second interface.

21 Claims, 8 Drawing Sheets

(56) References Cited

U.S. PATENT DOCUMENTS

| | | |
|---|---|---|
| 2007/0160012 A1 | 7/2007 | Liu |
| 2007/0281643 A1 | 12/2007 | Kawai |
| 2009/0092117 A1 | 4/2009 | Jiang et al. |
| 2010/0329404 A1* | 12/2010 | Xiang et al. ............... 375/356 |
| 2011/0032910 A1* | 2/2011 | Aarflot et al. ............. 370/335 |
| 2011/0243071 A1* | 10/2011 | Wu et al. .................. 370/328 |
| 2012/0113972 A1* | 5/2012 | Liu et al. .................. 370/338 |
| 2012/0287843 A1* | 11/2012 | Watanabe et al. .......... 370/315 |

OTHER PUBLICATIONS

Author Unknown, "Common Public Radio Interface (CPRI); Interface Specification," CPRI Specification V4.2, Ericsson AB, Sep. 29, 2010, 113 pages.

Ericsson, "Common Public Radio Interface (CPRI)," Interface Specification, CPRI Specification V4.0, Jun. 30, 2008, 96 pages.

Written Opinion for International Patent Application No. PCT/IB2012/055889, mailed Nov. 14, 2013, 7 pages.

International Preliminary Report on Patentability for PCT/IB2012/055889 mailed Jan. 24, 2014, 8 pages.

\* cited by examiner

DELAY COMPENSATION DURING SYNCHRONIZATION IN A BASE STATION IN A CELLULAR COMMUNICATION NETWORK

FIELD OF THE DISCLOSURE

The present disclosure relates to a base station in a cellular communication network and more particularly relates to delay compensation during synchronization of uplink and downlink frames in a base station in a cellular communication network.

BACKGROUND

In wireless, or cellular, communication networks, it is important that the downlink and uplink frame timing be synchronized between a base station and mobile devices served by the base station. The mobile devices connected to the base station use the same transmit and receive frequencies. To ensure that there is no interference between the mobile devices, the mobile devices are assigned time slots or sub-channel frequencies depending on the type of multiplexing (e.g., Time Division Duplex (TDD) or Frequency Division Duplex (FDD)). In either case, frame timing must be precisely maintained over radio links between the base station and the mobile devices.

Figure 1:
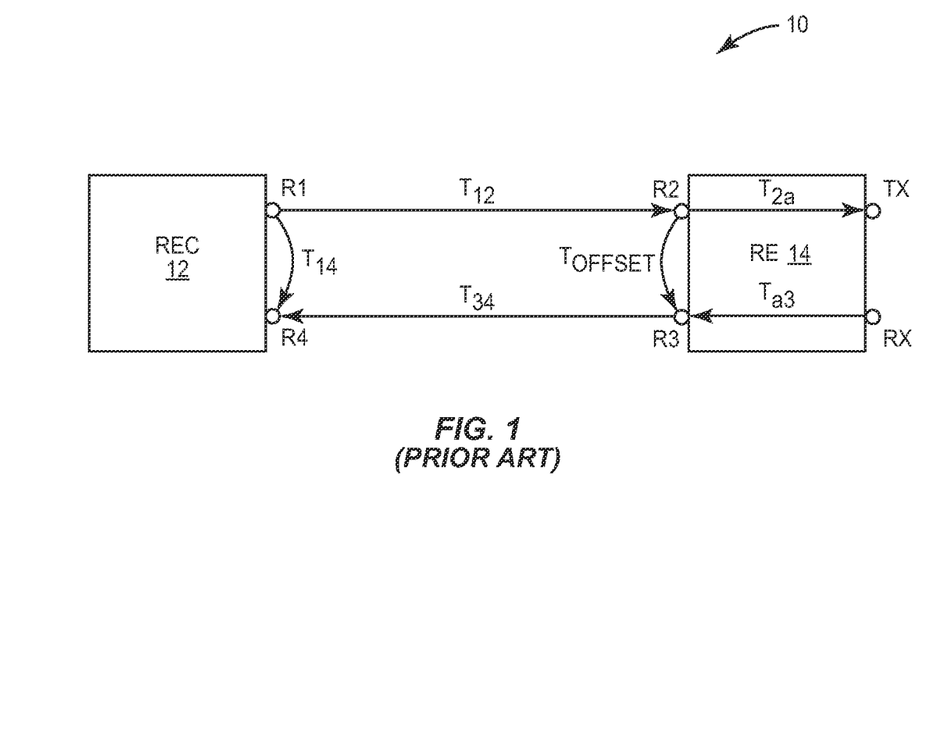
FIG. 1 illustrates a radio equipment controller and a radio equipment that together form at least part of a base station in a cellular communication network along with various delays accounted for during conventional synchronization.

As illustrated in FIG. 1, according to the Common Public Radio Interface (CPRI) specification, a base station 10 includes a radio equipment controller (REC) 12 and a radio equipment (RE) 14. The REC 12 is typically connected to the RE 14 via one or more cables, such as one or more fiber cables. The REC 12 includes radio functions in the digital baseband domain, whereas the RE 14 includes analog radio frequency functions. A generic interface between the REC 12 and the RE 14, which is referred to herein as a CPRI interface, enables communication between the REC 12 and the RE 14.

In order to maintain precise frame timing, a number of delays are determined. Specifically, as shown in FIG. 1, these delays include:

- $T_{12}$: Cable delay ($T_{12}$) is a delay between an output interface (R1) of the REC 12 and an input interface (R2) of the RE 14 due to a cable connecting the output interface (R1) of the REC 12 to the input interface (R2) of the RE 14,
- $T_{OFFSET}$: In-equipment delay ($T_{OFFSET}$) is an internal delay of the RE 14 from the input interface (R2) of the RE 14 to an output interface (R3) of the RE 14,
- $T_{34}$: Cable delay ($T_{34}$) is a delay from the output interface (R3) of the RE 14 to an input interface (R4) of the REC 12 due to a cable connecting the output interface (R3) of the RE 14 to the input interface (R4) of the REC 12,
- $T_{14}$: Total round-trip delay ($T_{14}$) that is the sum of $T_{12}$, $T_{OFFSET}$, and $T_{34}$,
- $T_{2a}$: In-equipment downlink delay ($T_{2a}$) is an internal delay of the RE 14 from the input interface (R2) of the RE 14 to a transmit port (TX) or antenna of the RE 14, and
- $T_{a3}$: In-equipment uplink delay ($T_{a3}$) is an internal delay of the RE 14 from a receive port (RX) or antenna of the RE 14 to the output interface (R3) of the RE 14.

In operation, the RE 14 estimates the in-equipment delay ($T_{OFFSET}$), the in-equipment downlink delay ($T_{2a}$), and the in-equipment uplink delay ($T_{a3}$) and reports those estimates to the REC 12. The cable delays ($T_{12}$ and $T_{34}$) are then determined by the REC 12 using a synchronization process. For the synchronization process, the REC 12 transmits a sync byte, which is referred to as a K28.5 sync byte in the CPRI specification, from the output interface (R1) of the REC 12 to the input interface (R2) of the RE 14. The RE 14 then passes the sync byte from the input interface (R2) of the RE 14 to the output interface (R3) of the RE 14 such that the sync byte is looped-back to the REC 12. Using the sync byte, the REC 12 measures the total round-trip delay ($T_{14}$), which is the amount of time between a time at which the sync byte was sent from the output interface (R1) of the REC 12 and a time at which the sync byte was received at the input interface (R4) of the REC 12. Then, the REC 12 computes the cable delays ($T_{12}$ and $T_{34}$) as:

$$T_{12} = T_{34} = \frac{(T_{14} - T_{OFFSET})}{2},$$

where $T_{14}$ is the total round-trip delay measured by the REC 12 using the sync byte.

In some implementations, strict requirements are placed on the maximum in-equipment downlink delay ($T_{2a}$) that can be reported to the REC 12. An issue arises when the actual in-equipment downlink delay ($T_{2a}$) is greater than the maximum allowable in-equipment downlink delay ($T_{2a}$) that can be reported to the REC 12. As such, there is a need for systems and methods for addressing this issue without totally redesigning the RE 14.

SUMMARY

The present disclosure relates to delay compensation during synchronization of uplink and downlink frames in a base station in a cellular communication network. In general, the base station includes a radio equipment and a radio equipment controller that together form at least part of the base station. In one embodiment, the radio equipment includes a first interface configured to receive data from the radio equipment controller and a second interface configured to send data to the radio equipment controller. During synchronization, the radio equipment receives, at the first interface of the radio equipment, a synchronization message from the radio equipment controller. The radio equipment then passes the synchronization message from the first interface of the radio equipment to the second interface of the radio equipment with a synthetic delay that is in addition to an in-equipment delay from the first interface to the second interface.

In one preferred embodiment, the radio equipment reports an in-equipment downlink delay for the radio equipment to the radio equipment controller that is less than an actual in-equipment downlink delay for the radio equipment, and the synthetic delay compensates for reporting the in-equipment downlink delay for the radio equipment to the radio equipment controller that is less than the actual in-equipment downlink delay for the radio equipment.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for providing delay compensation during synchronization between a radio equipment and a radio equipment controller that together form at least part of a base station in a cellular communication network. In one embodiment, the radio equipment includes a first interface configured to receive data from the radio equipment controller and a second interface configured to send data to the radio equipment controller. During synchronization, the radio equipment receives, at the first interface of the radio equipment, a synchronization message from the radio equipment controller. The radio equipment then passes the synchronization message from the first interface of the radio equipment to the second interface of the radio equipment with a synthetic delay that is in addition to an in-equipment delay from the first interface to the second interface. In one preferred embodiment, the radio equipment reports an in-equipment downlink delay for the radio equipment to the radio equipment controller that is less than an actual in-equipment downlink delay for the radio equipment, and the synthetic delay compensates for reporting the in-equipment downlink delay for the radio equipment to the radio equipment controller that is less than the actual in-equipment downlink delay for the radio equipment.

Figure 2A:
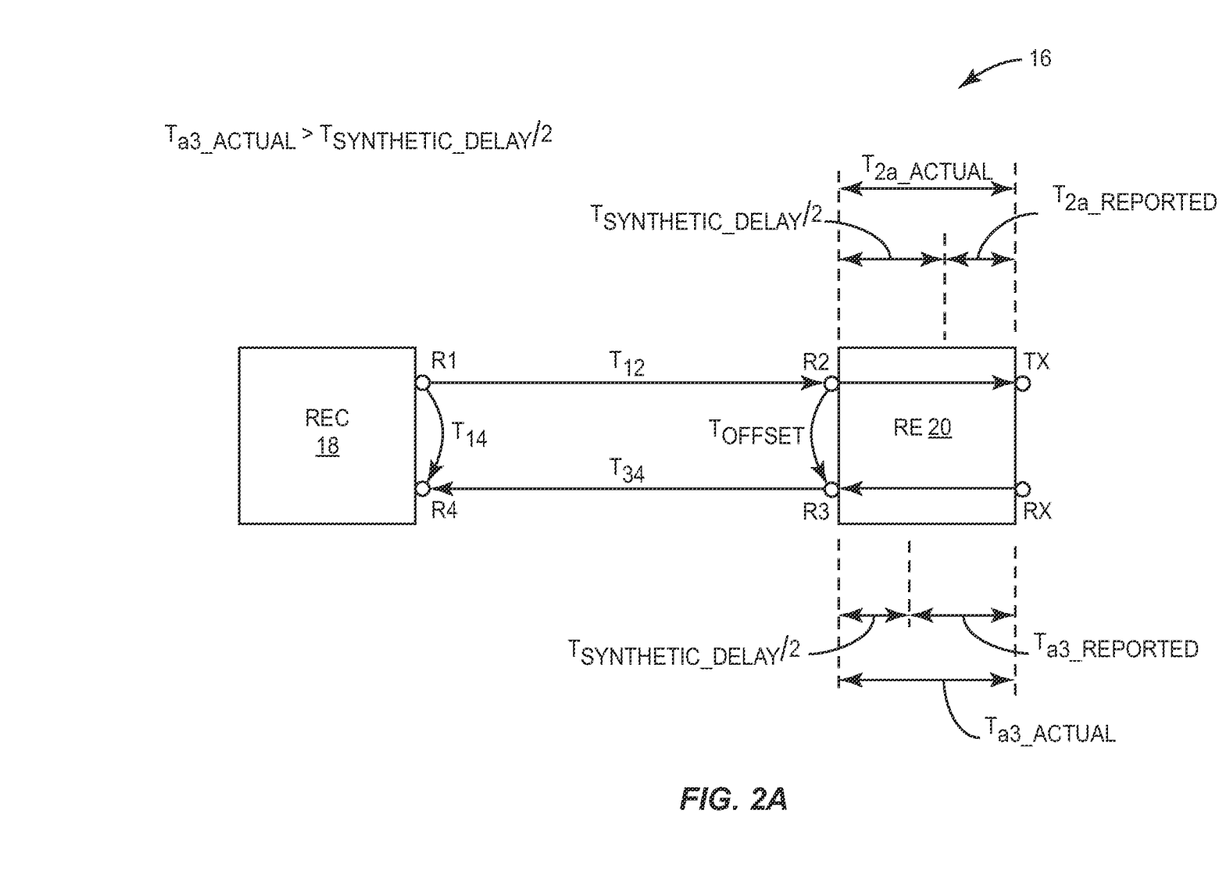
FIGS. 2A through 2C illustrate a radio equipment controller and a radio equipment that together form at least part of a base station in a cellular communication network, where the radio equipment adds a synthetic delay during synchronization that compensates for reporting an in-equipment downlink delay that is less than an actual in-equipment downlink delay according to various embodiments of the present disclosure.
Figure 2B:
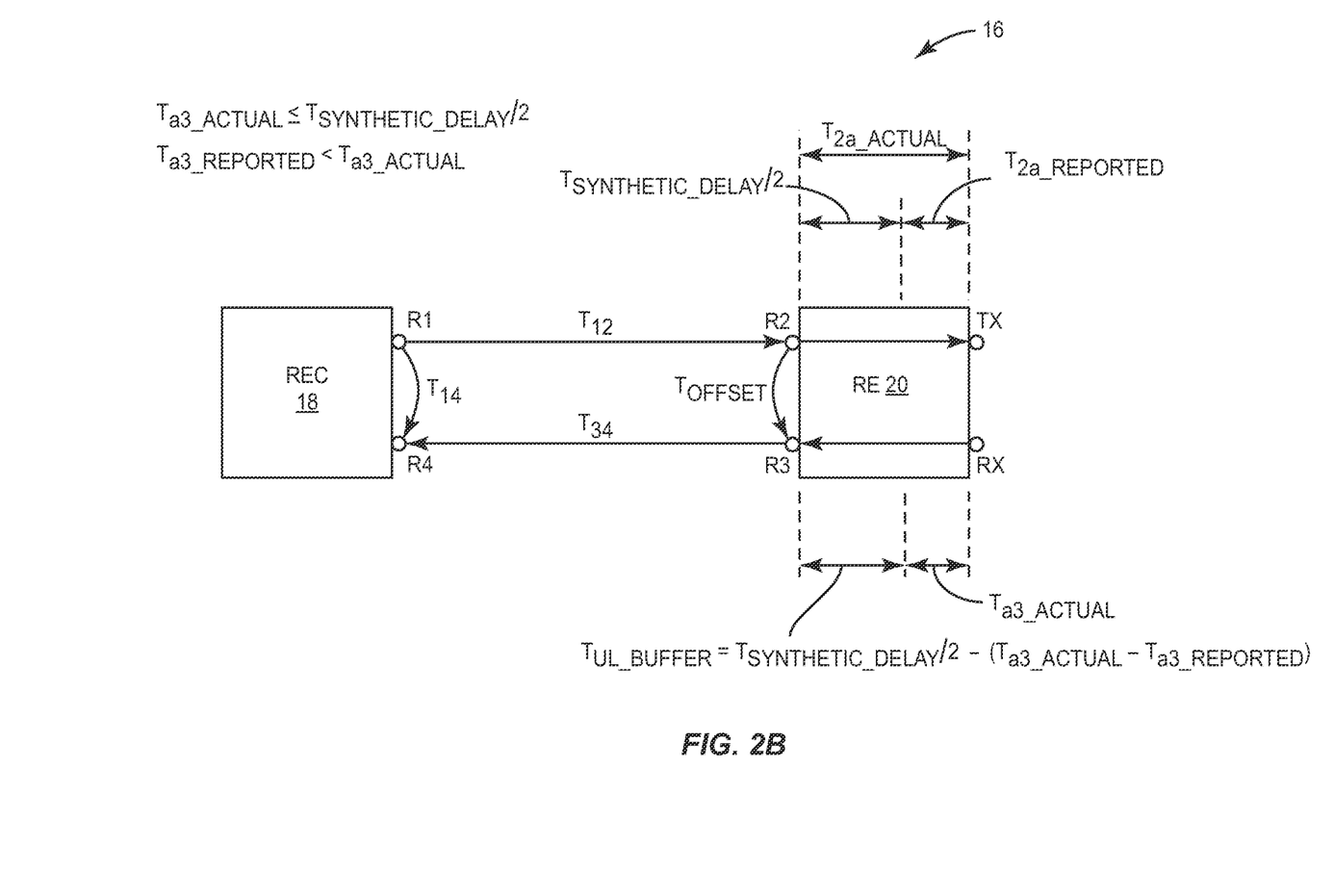
Figure 2C:
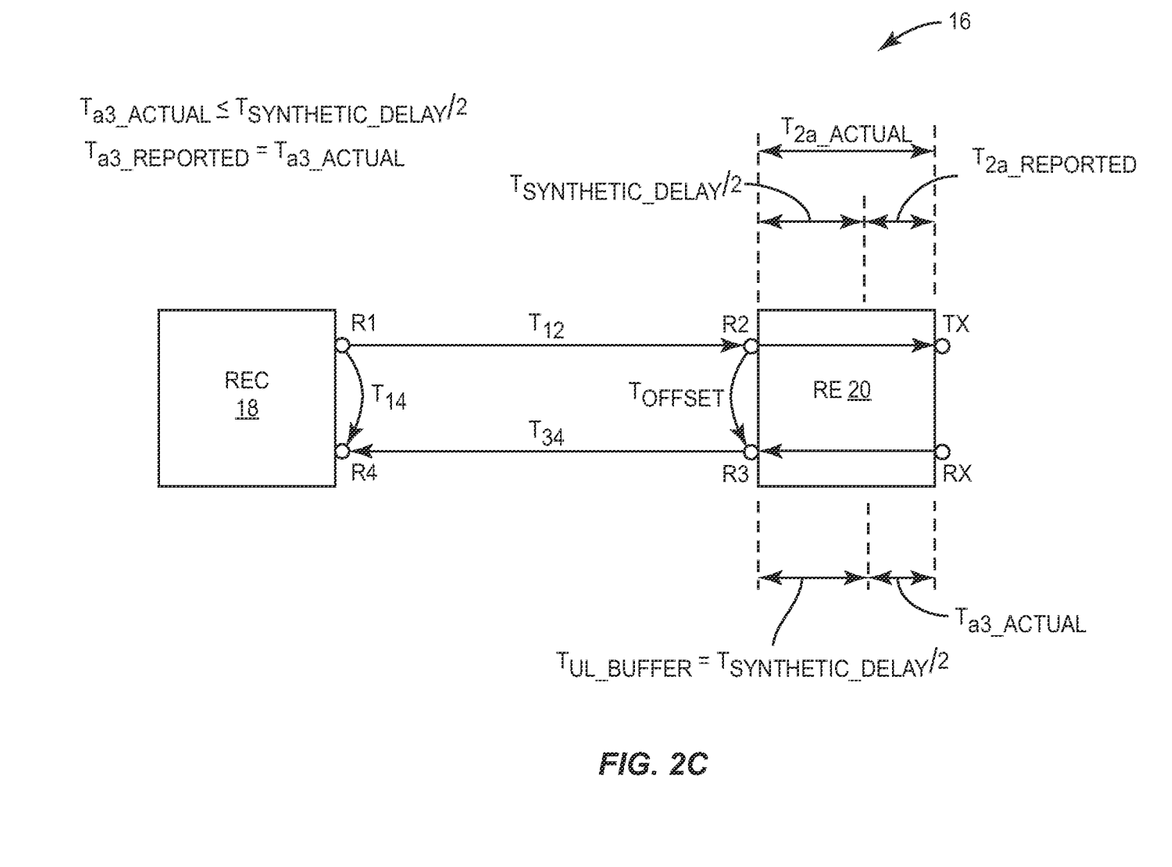

FIGS. 2A through 2C illustrate a base station 16 for a cellular communication network according to various embodiments of the present disclosure. As illustrated, the base station 16 includes a radio equipment controller (REC) 18 and a radio equipment (RE) 20. The REC 18 is connected to the RE 20 via one or more cables, such as one or more fiber cables. The REC 18 includes radio functions in the digital baseband domain, whereas the RE 20 includes analog radio frequency functions. A generic interface between the REC 18 and the RE 20, which is referred to herein as a Common Public Radio Interface (CPRI) interface, enables communication between the REC 18 and the RE 20.

As shown in FIGS. 2A through 2C, the base station 16 includes the following delays:

$T_{12}$: Cable delay ($T_{12}$) is a delay between an output interface (R1) of the REC 18 and an input interface (R2) of the RE 20 due to a cable connecting the output interface (R1) of the REC 18 to the input interface (R2) of the RE 20, $T_{OFFSET}$: In-equipment delay ($T_{OFFSET}$) is an internal delay of the RE 20 from the input interface (R2) of the RE 20 to an output interface (R3) of the RE 20, $T_{34}$: Cable delay ($T_{34}$) is a delay from the output interface (R3) of the RE 20 to an input interface (R4) of the REC 18 due to a cable connecting the output interface (R3) of the RE 20 to the input interface (R4) of the REC 18, $T_{2a\_ACTUAL}$: Actual in-equipment downlink delay ($T_{2a\_ACTUAL}$) is an actual internal delay of the RE 20 from the input interface (R2) of the RE 20 to a transmit port (TX) or antenna of the RE 20, $T_{2a\_REPORTED}$: Reported in-equipment downlink delay ($T_{2a\_REPORTED}$) is a reported internal delay of the RE 20 from the input interface (R2) of the RE 20 to the transmit port (TX) or antenna of the RE 20, where $T_{2a\_REPORTED} < T_{2a\_ACTUAL}$, $T_{a3\_ACTUAL}$: Actual in-equipment uplink delay ($T_{a3\_ACTUAL}$) is an actual internal delay of the RE 20 from a receive port (RX) or antenna of the RE 20 to the output interface (R3) of the RE 20, $T_{a3\_REPORTED}$: Reported in-equipment uplink delay ($T_{a3\_REPORTED}$) is a reported internal delay of the RE 20 from the receive port (RX) or antenna of the RE 20 to the output interface (R3) of the RE 20, $T_{SYNTHETIC\_DELAY}$: Synthetic delay ($T_{SYNTHETIC\_DELAY}$) is a synthetic, or artificial, delay added by the RE 20 during synchronization to compensate for the reported in-equipment downlink delay ($T_{2a\_REPORTED}$) that is reported by the RE 20 to the REC 18 being less than the actual in-equipment downlink delay ($T_{2a\_ACTUAL}$) of the RE 20, $T_{UL\_BUFFER}$: Uplink buffer delay ($T_{UL\_BUFFER}$) is a delay of a buffer used in some embodiments when the actual in-equipment uplink delay ($T_{a3\_ACTUAL}$) is less than half of the synthetic delay (i.e., $T_{SYNTHETIC\_DELAY}/2$), and $T_{14}$: Total round-trip delay ($T_{14}$) is the sum of $T_{12}$, $T_{OFFSET}$, $T_{SYNTHETIC\_DELAY}$, and $T_{34}$.

Before proceeding, it should be noted that the input and output interfaces (R1 and R4) of the REC 18 are referred to as an input/output port of the REC 18. Similarly, the input and output interfaces (R2 and R3) of the RE 20 are referred to as an input/output port of the RE 20. A communication link, which in the preferred embodiment is a CPRI link, is provided between the input/output port of the REC 18 and the input/output port of the RE 20. In one embodiment, the communication link is via a single fiber cable that connects the input/output port of the REC 18 and the input/output port of the RE 20. In one particular embodiment, the single fiber cable includes a first fiber that connects the output interface (R1) of the REC 18 and the input interface (R2) of the RE 20 and a second fiber that connects the output interface (R3) of the RE 20 and the input interface (R4) of the REC 18. Alternatively, a single fiber may be used where different wavelengths are used to connect the output interface (R1) of the REC 18 to the input interface (R2) of the RE 20 and the output interface (R3) of the RE 20 to the input interface (R4) of the REC 18. It should also be noted, that the present disclosure is not limited to a fiber cable. Other types of cables (e.g., copper cables) may be used. Further, separate cables may be used to connect the output interface (R1) of the REC 18 to the input interface (R2) of the RE 20 and the output interface (R3) of the RE 20 to the input interface (R4) of the REC 18.

In operation, the RE 20 estimates the in-equipment delay ($T_{OFFSET}$), the actual in-equipment downlink delay ($T_{2a\_ACTUAL}$), and the actual in-equipment uplink delay ($T_{a3\_ACTUAL}$). The RE 20 reports the in-equipment delay ($T_{OFFSET}$) to the REC 18. However, rather than reporting the actual in-equipment downlink delay ($T_{2a\_ACTUAL}$) to the REC 18, the RE 20 reports a predefined value to the REC 18 as the in-equipment downlink delay of the RE 20, which is referred to herein as the reported in-equipment downlink delay ($T_{2a\_REPORTED}$). Also, in some embodiments, rather than reporting the actual in-equipment uplink delay ($T_{a3\_ACTUAL}$) to the REC 18, the RE 20 reports a predefined value to the REC 18 as the in-equipment uplink delay of the RE 20, which is referred to herein as the reported in-equipment uplink delay ($T_{a3\_REPORTED}$). Note, however, that in one embodiment, the RE 20 reports the actual in-equipment uplink delay to the REC 18 (i.e., $T_{a3\_REPORTED} = T_{a3\_ACTUAL}$).

In general, the reported in-equipment downlink delay ($T_{2a\_REPORTED}$) is a predefined value that is less than the actual in-equipment downlink delay ($T_{2a\_ACTUAL}$). In one embodiment, the REC 18 has a maximum acceptable in-equipment downlink delay that can be reported to the REC 18, and the reported in-equipment downlink delay ($T_{2a\_REPORTED}$) is set to the maximum acceptable in-equipment downlink delay or, alternatively, a value that is less than the maximum acceptable in-equipment downlink delay.

The synthetic delay ($T_{SYNTHETIC\_DELAY}$) is a function of the actual in-equipment downlink delay ($T_{2a\_ACTUAL}$) and the reported in-equipment downlink delay ($T_{2a\_REPORTED}$). More specifically, the synthetic delay ($T_{SYNTHETIC\_DELAY}$) is defined as:

$$T_{SYNTHETIC\_DELAY} = 2(T_{2a\_ACTUAL} - T_{2a\_REPORTED}),$$

where, again, $T_{2a\_ACTUAL} > T_{2a\_REPORTED}$. Thus, as an example, if $T_{2a\_ACTUAL} = 40$ microseconds and $T_{2a\_REPORTED} = 13$ microseconds, then the synthetic delay ($T_{SYNTHETIC\_DELAY}$) is 54 microseconds.

The reported in-equipment uplink delay ($T_{a3\_REPORTED}$) may vary depending on the particular implementation. In general, as discussed below in more detail, the synthetic delay ($T_{SYNTHETIC\_DELAY}$) appears to the REC 18 as additional cable delay, and care must be taken to ensure that the delay seen by the REC 18 with respect to the uplink is what is expected by the REC 18. Assuming that the REC 18 does not allow reporting of a negative in-equipment uplink delay, as shown in the embodiment of FIG. 2A, if $$T_{a3\_ACTUAL} > \frac{T_{SYNTHETIC\_DELAY}}{2},$$

then the reported in-equipment uplink delay ($T_{a3\_REPORTED}$) may be defined as:

$$T_{a3\_REPORTED} = T_{a3\_ACTUAL} - \frac{T_{SYNTHETIC\_DELAY}}{2}.$$

In this manner, the delay seen by the REC 18 with respect to the uplink is as expected by the REC 18.

As an example, if the actual in-equipment uplink delay ($T_{a3\_ACTUAL}$) is 20 microseconds and the synthetic delay ($T_{SYNTHETIC\_DELAY}$) is 16 microseconds, then the reported in-equipment uplink delay ($T_{a3\_REPORTED}$) is 12 microseconds. Thus, to the REC 18, the uplink signals travel over 12 microseconds of in-equipment uplink delay at the RE 20 plus 8 microseconds of cable delay in addition to the actual cable delay. In reality, the uplink signals travel over 20 microseconds of in-equipment uplink delay at the RE 20. However, as long as $T_{a3\_REPORTED} + T_{SYNTHETIC\_DELAY}/2$ is equal to $T_{a3\_ACTUAL}$, the delay seen by the REC 18 is as expected by the REC 18.

In contrast, in the embodiment of FIG. 2B, $$T_{a3\_ACTUAL} \leq \frac{T_{SYNTHETIC\_DELAY}}{2},$$

and $$T_{a3\_REPORTED} < T_{a3\_ACTUAL}.$$

In this embodiment, an additional uplink buffer is implemented at the RE 20 to delay uplink signals received by the RE 20 and sent to the REC 18 such that:

$$T_{UL\_BUFFER} = \frac{T_{SYNTHETIC\_DELAY}}{2} - (T_{a3\_ACTUAL} - T_{a3\_REPORTED}),$$

where $T_{UL\_BUFFER}$ is a delay of the uplink buffer. By setting the uplink buffer delay ($T_{UL\_BUFFER}$) equal to half of the synthetic delay ($T_{SYNTHETIC\_DELAY}$) plus the difference of the actual in-equipment uplink delay ($T_{a3\_ACTUAL}$) and the reported in-equipment uplink delay ($T_{a3\_REPORTED}$), the delay seen by the REC 18 for uplink signals is what is expected.

As an example, if the actual in-equipment uplink delay ($T_{a3\_ACTUAL}$) is 18 microseconds, the reported in-equipment uplink delay ($T_{a3\_REPORTED}$) is 12 microseconds, and the synthetic delay ($T_{SYNTHETIC\_DELAY}$) is 54 microseconds, then the uplink buffer delay ($T_{UL\_BUFFER}$) is 21 microseconds. Thus, to the REC 18, the uplink signals travel over 12 microseconds of in-equipment uplink delay at the RE 20 plus 27 microseconds of cable delay in addition to the actual cable delay. In reality, the uplink signals travel over 18 microseconds of in-equipment uplink delay at the RE 20 plus 21 microseconds of uplink buffer delay at the RE 20. However, the important thing to note is that the REC 18 sees 39 microseconds of delay, which is equal to the 39 microseconds of delay expected by the REC 18.

FIG. 2C illustrates a special case of the embodiment of FIG. 2B where:

$$T_{a3\_ACTUAL} \leq \frac{T_{SYNTHETIC\_DELAY}}{2},$$

and $$T_{a3\_REPORTED} < T_{a3\_ACTUAL}.$$

In this embodiment, an additional uplink buffer is implemented at the RE 20 to delay uplink signals received by the RE 20 and sent to the REC 18 such that:

$$T_{UL\_BUFFER} = \frac{T_{SYNTHETIC\_DELAY}}{2},$$

where $T_{UL\_BUFFER}$ is the delay of the uplink buffer. By setting the uplink buffer delay ($T_{UL\_BUFFER}$) equal to half of the synthetic delay ($T_{SYNTHETIC\_DELAY}$), the delay seen by the REC 18 for uplink signals is what is expected.

As an example, if the actual in-equipment uplink delay ($T_{a3\_ACTUAL}$) is 12 microseconds and the synthetic delay ($T_{SYNTHETIC\_DELAY}$) is 40 microseconds, then the reported in-equipment uplink delay ($T_{a3\_REPORTED}$) is 12 microseconds, and the uplink buffer delay ($T_{UL\_BUFFER}$) is 20 microseconds. Thus, to the REC 18, the uplink signals travel over 12 microseconds of in-equipment uplink delay at the RE 20 plus 20 microseconds of cable delay in addition to the actual cable delay. In reality, the uplink signals travel over 12 microseconds of in-equipment uplink delay at the RE 20 plus 20 microseconds of uplink buffer delay at the RE 20. However, the important thing to note is that the REC 18 sees 32 microseconds of delay, which is equal to the 32 microseconds of delay expected by the REC 18.

In order to synchronize uplink and downlink frames, the REC 18 and the RE 20 perform a synchronization process. For the synchronization process, the REC 18 transmits a synchronization message from the output interface (R1) of the REC 18 to the input interface (R2) of the RE 20. In one preferred embodiment, communication between the REC 18 and the RE 20 is via a CPRI link, and the synchronization message is a K28.5 sync byte in a CPRI basic frame. However, the present disclosure is not limited to CPRI. Other types of interfaces may be used between the REC 18 and the RE 20. Upon receiving the synchronization message, the RE 20 passes the synchronization message from the input interface (R2) of the RE 20 to the output interface (R3) of the RE 20 with the synthetic delay ($T_{SYNTHETIC\_DELAY}$) such that the synchronization message is looped back to the REC 18. Using the synchronization message, the REC 18 measures the total round-trip delay ($T_{14}$), which is the amount of time between a time at which the synchronization message was sent from the output interface (R1) of the REC 18 and a time at which the sync byte was received at the input interface (R4) of the REC 18. Notably, in the preferred embodiment, a single cable preferably include two fibers connects the output interface (R1) of the REC 18 to the input interface (R2) of the RE 20 and the output interface (R3) of the RE 20 to the input interface (R4) of the REC 18. However, in an alternative embodiment, separate cables may be used.

According to the present disclosure, during synchronization, the RE 20 applies the synthetic delay ($T_{SYNTHETIC\_DELAY}$) to the synchronization message prior to returning the synchronization message to the REC 18. The synthetic delay ($T_{SYNTHETIC\_DELAY}$) is in addition to the in-equipment delay ($T_{OFFSET}$) between the input interface (R2) of the RE 20 and the output interface (R3) of the RE 20 and, as discussed above, compensates for the reported in-equipment downlink delay ($T_{2a\_REPORTED}$) being less than the actual in-equipment downlink delay ($T_{2a\_ACTUAL}$) of the RE 20. As such, the total round-trip delay ($T_{14}$) measured by the REC 18 during the synchronization process is defined as:

$$T_{14} = T_{12} + T_{OFFSET} + T_{SYNTHETIC\_DELAY} + T_{34}.$$

By reporting the actual in-equipment delay ($T_{OFFSET}$) between the input interface (R2) of the RE 20 and the output interface (R3) of the RE 20 to the REC 18 and applying the synthetic delay ($T_{SYNTHETIC\_DELAY}$) to the synchronization message during the synchronization process, the synthetic delay ($T_{SYNTHETIC\_DELAY}$) is viewed by the REC 18 as additional cable delay. In other words, the REC 18 sees the synthetic delay ($T_{SYNTHETIC\_DELAY}$) as part of the cable delays ($T_{12}$ and $T_{34}$). Specifically, the REC 20 sees half of the synthetic delay ($T_{SYNTHETIC\_DELAY}$) as part of the cable delay ($T_{12}$) and the other half of the synthetic delay ($T_{SYNTHETIC\_DELAY}$) as part of the cable delay ($T_{34}$).

By applying the synthetic delay ($T_{SYNTHETIC\_DELAY}$) during synchronization, the resulting additional cable delay, as viewed by the REC 18, compensates for the reported in-equipment downlink delay ($T_{2a\_REPORTED}$) being less than the actual in-equipment downlink delay ($T_{2a\_ACTUAL}$) of the RE 20. Specifically, the actual in-equipment downlink delay ($T_{2a\_ACTUAL}$) is seen by the REC 18 as the sum of the reported in-equipment downlink delay ($T_{2a\_REPORTED}$) and the additional cable delay (i.e., an artificial cable delay equal to $T_{SYNTHETIC\_DELAY}/2$). As a result of this compensation, the actual in-equipment downlink delay ($T_{2a\_ACTUAL}$) of the RE 20 can be larger than the reported in-equipment downlink delay ($T_{2a\_REPORTED}$) of the RE 20 as long as an apparent cable delay ($T_{CABLE\_APPARENT}$) seen by the REC 18 is less than a maximum acceptable cable delay. The apparent cable delay ($T_{CABLE\_APPARENT}$) seen by the REC 18 is defined as:

$$T_{CABLE\_APPARENT} = T_{CABLE\_ACTUAL} + \frac{T_{SYNTHETIC\_DELAY}}{2}, \text{ where}$$

$$T_{CABLE\_ACTUAL} = T_{12} = T_{34}, \text{ and}$$

$$T_{12\_APPARENT} = T_{34\_APPARENT} = T_{CABLE\_APPARENT}.$$

Figure 3:
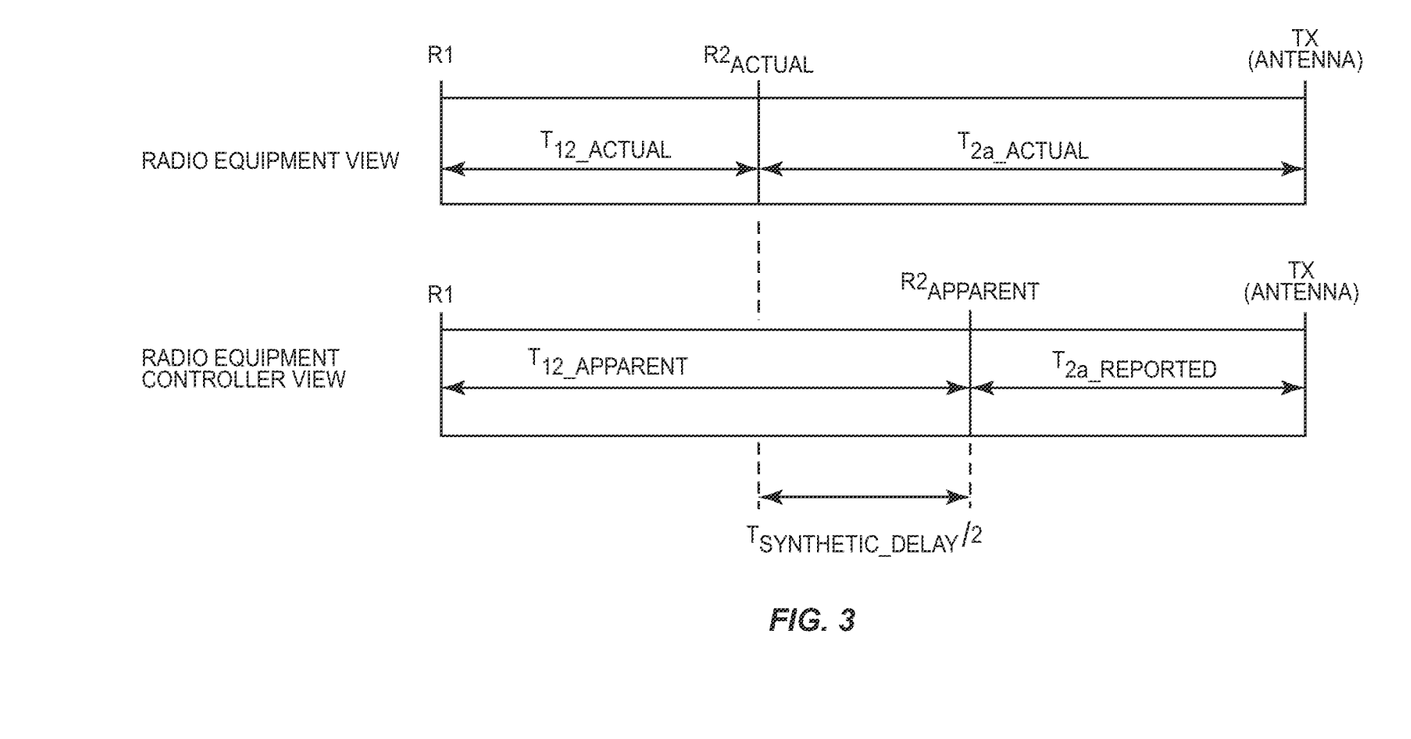
FIG. 3 illustrates actual and apparent delays as viewed by the radio equipment and the radio equipment controller according to one embodiment of the present disclosure.

FIG. 3 illustrates the delays for downlink signals as viewed by the REC 18 as compared to the actual delays according to one embodiment of the present disclosure. As illustrated, from the view of the RE 20, the delay from the output interface (R1) of the REC 18 to the transmit port (TX) of the RE 20 is the sum of an actual cable delay ($T_{12\_ACTUAL}$) and the actual in-equipment downlink delay ($T_{2a\_ACTUAL}$) of the RE 20. In contrast, from the view of the REC 18, the delay from the output interface (R1) of the REC 18 to the transmit port (TX) of the RE 20 is the sum of an apparent cable delay ($T_{12\_APPARENT}$) and the reported in-equipment downlink delay ($T_{2a\_REPORTED}$) of the RE 20.

Figure 4:
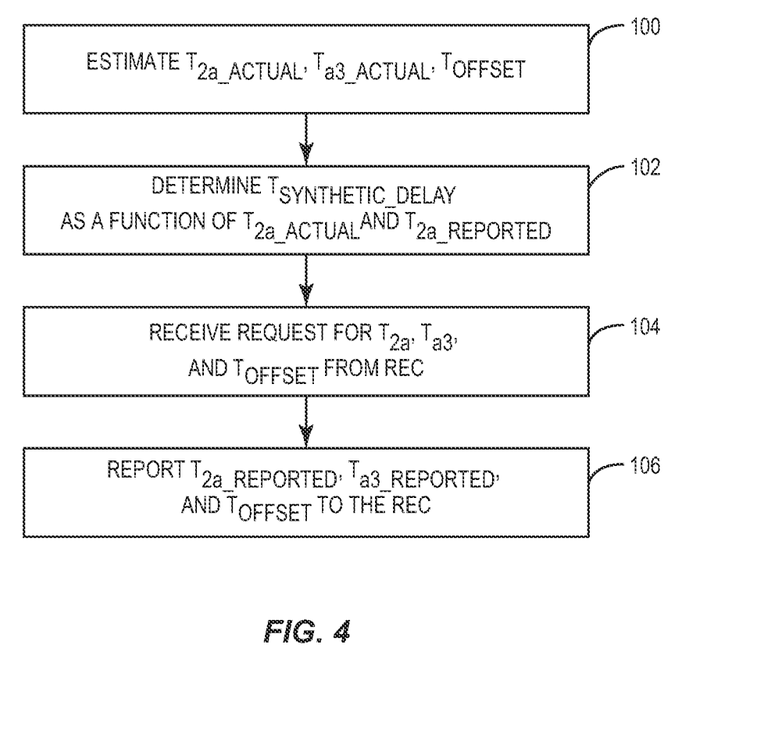
FIG. 4 is a flow chart illustrating a process for determining a synthetic delay to be used to compensate for a desired in-equipment downlink delay that is less than an actual in-equipment downlink delay and reporting the desired in-equipment downlink delay, rather than the actual in-equipment downlink delay, to the radio equipment controller according to one embodiment of the present disclosure.

FIG. 4 is a flow chart illustrating a process for determining the synthetic delay ($T_{SYNTHETIC\_DELAY}$) to be used by the RE 20 to compensate for the reported in-equipment downlink delay ($T_{2a\_REPORTED}$) that is less than the actual in-equipment downlink delay ($T_{2a\_ACTUAL}$) and reporting the reported in-equipment downlink delay ($T_{2a\_REPORTED}$), rather than the actual in-equipment downlink delay ($T_{2a\_ACTUAL}$), to the REC 18 according to one embodiment of the present disclosure. As illustrated, the RE 20 first estimates the actual in-equipment downlink delay ($T_{2a\_ACTUAL}$), the actual in-equipment uplink delay ($T_{a3\_ACTUAL}$), and the in-equipment delay ($T_{OFFSET}$) (step 100). Any suitable technique may be used to estimate the actual in-equipment downlink delay ($T_{2a\_ACTUAL}$), the actual in-equipment uplink delay ($T_{a3\_ACTUAL}$), and the in-equipment delay ($T_{OFFSET}$). As an example, the RE 20 may store one or more preconfigured look-up tables that store values for the actual in-equipment downlink delay ($T_{2a\_ACTUAL}$), the actual in-equipment uplink delay ($T_{a3\_ACTUAL}$), and the in-equipment delay ($T_{OFFSET}$) based on inputs such as, for example, temperature, frequency, and/or the like.

Next, the RE 20 computes or otherwise determines the synthetic delay ($T_{SYNTHETIC\_DELAY}$) as a function of the actual in-equipment downlink delay ($T_{2a\_ACTUAL}$) and the reported in-equipment downlink delay ($T_{2a\_REPORTED}$) (step 102). More specifically, as discussed above, the synthetic delay ($T_{SYNTHETIC\_DELAY}$) may be computed as:

$$T_{SYNTHETIC\_DELAY} = 2(T_{2a\_ACTUAL} - T_{2a\_REPORTED}).$$

Sometime after computing the synthetic delay ($T_{SYNTHETIC\_DELAY}$), the RE 20 receives, from the REC 18, a request for the in-equipment downlink delay ($T_{2a}$), the in-equipment uplink delay ($T_{a3}$), and the in-equipment delay ($T_{OFFSET}$) of the RE 20 (step 104). In response, the RE 20 reports the reported in-equipment downlink delay ($T_{2a\_REPORTED}$), the reported in-equipment uplink delay ($T_{a3\_REPORTED}$), and the in-equipment delay ($T_{OFFSET}$) to the REC 18 (step 106). As discussed above, the reported in-equipment downlink delay ($T_{2a\_REPORTED}$) is a predefined value that is less than the actual in-equipment downlink delay ($T_{2a\_ACTUAL}$). In one embodiment, the REC 18 has a maximum acceptable in-equipment downlink delay that can be reported to the REC 18, and the reported in-equipment downlink delay ($T_{2a\_REPORTED}$) is set to the maximum acceptable in-equipment downlink delay or, alternatively, a value that is less than the maximum acceptable in-equipment downlink delay. As also discussed above, the reported in-equipment uplink delay ($T_{a3\_REPORTED}$) may vary depending on the particular implementation and, in some embodiments, requires additional uplink buffering at the RE 20.

Figure 5:
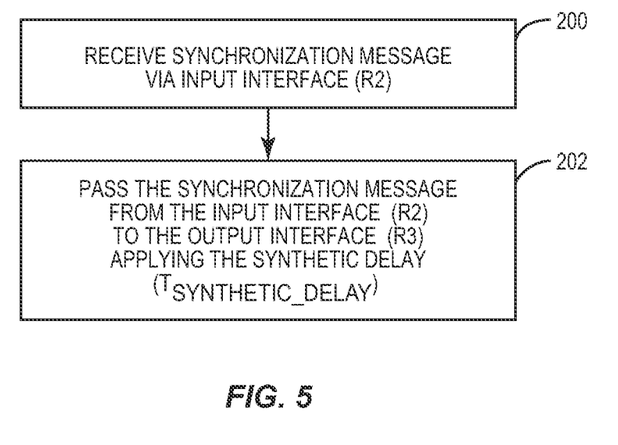
FIG. 5 is a flow chart illustrating process for adding a synthetic delay during synchronization according to one embodiment of the present disclosure.

FIG. 5 is a flow chart illustrating a process for adding the synthetic delay ($T_{SYNTHETIC\_DELAY}$) during synchronization according to one embodiment of the present disclosure. As illustrated, the RE 20 first receives a synchronization message from the REC 18 at the input interface (R2) of the RE 20 (step 200). In one embodiment, the synchronization message is a synchronization byte and, even more specifically, a CPRI K28.5 sync byte. The RE 20 then passes the synchronization message from the input interface (R2) of the RE 20 to the output interface (R3) of the RE 20 with the synthetic delay ($T_{SYNTHETIC\_DELAY}$) such that the synchronization message is returned to the REC 18 (step 202). The RE 20 may apply the synthetic delay ($T_{SYNTHETIC\_DELAY}$) using any suitable delay technique. For example, the synthetic delay ($T_{SYNTHETIC\_DELAY}$) may be applied using a software or hardware buffer. As another example, if the synchronization message is a CPRI K28.5 sync byte in a basic frame, the RE 20 may effectively apply the synthetic delay ($T_{SYNTHETIC\_DELAY}$) by altering the frame number.

Figure 6:
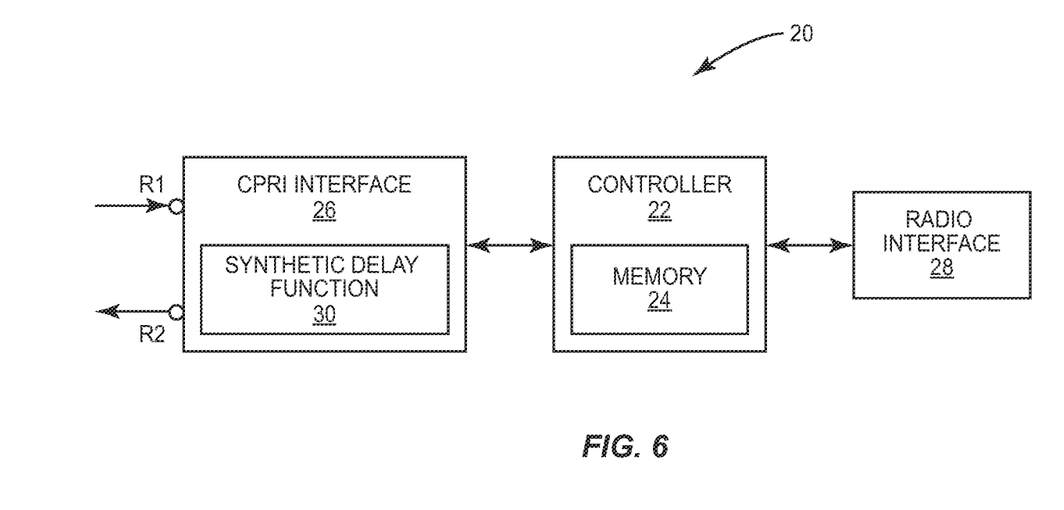
FIG. 6 is a block diagram of the radio equipment of FIGS. 2A through 2C according to one embodiment of the present disclosure.

FIG. 6 is a block diagram of the RE 20 of FIG. 2 according to one embodiment of the present disclosure. As illustrated, in this embodiment, the RE 20 includes a controller 22 having associated memory 24, a CPRI interface 26, and a radio interface 28. The controller 22 is a microprocessor, Application Specific Integrated Circuit (ASIC), Field Programmable Gate Array (FPGA), or similar hardware controller, or a combination thereof. In this particular embodiment, the controller 22 executes software stored in the memory 24 to provide at least some of the functionality described herein (e.g., computing the synthetic delay ($T_{SYNTHETIC\_DELAY}$)). The CPRI interface 26 provides a CPRI link between the RE 20 and the REC 18. In addition, in this embodiment, the CPRI interface 26 includes a synthetic delay function 30 that operates to apply the synthetic delay ($T_{SYNTHETIC\_DELAY}$) during the synchronization process. For example, the synthetic delay function 30 may include a hardware or software buffer that applies the synthetic delay ($T_{SYNTHETIC\_DELAY}$). Note, however, that the synthetic delay ($T_{SYNTHETIC\_DELAY}$) may alternatively be applied by the controller 22 (e.g., a software mechanism to apply the synthetic delay ($T_{SYNTHETIC\_DELAY}$)). The radio interface 28 provides radio frequency wireless communication channels between the base station 16 and mobile stations within the coverage area of the base station 16.

The following acronyms are used throughout this disclosure.

ASIC Application Specific Integrated Circuit
CPRI Common Public Radio Interface
FDD Frequency Division Duplex
FPGA Field Programmable Gate Array
RE Radio Equipment
REC Radio Equipment Controller
TDD Time Division Duplex Those skilled in the art will recognize improvements and modifications to the preferred embodiments of the present disclosure. All such improvements and modifications are considered within the scope of the concepts disclosed herein and the claims that follow.

What is claimed is:

1. A method of operation of a radio equipment connected to a radio equipment controller that together form at least part of a base station in a cellular communication network, comprising:
   receiving, at a first interface of the radio equipment, a synchronization message from the radio equipment controller, the first interface configured to receive data from the radio equipment controller;
   passing the synchronization message from the first interface of the radio equipment to a second interface of the radio equipment with a synthetic delay that is in addition to an in-equipment delay from the first interface to the second interface that is reported to the radio equipment controller, the second interface configured to send data to the radio equipment controller; and
   reporting, to the radio equipment controller, an in-equipment downlink delay for the radio equipment that is less than an actual in-equipment downlink delay for the radio equipment;
   wherein the synthetic delay compensates for reporting the in-equipment downlink delay for the radio equipment that is less than the actual in-equipment downlink delay for the radio equipment.

2. The method of claim 1 wherein the synthetic delay artificially increases a total round-trip delay determined by the radio equipment controller based on the synchronization message.

3. The method of claim 1 wherein the synthetic delay is approximately equal to two times a difference between the actual in-equipment downlink delay for the radio equipment and the in-equipment downlink delay for the radio equipment reported to the radio equipment controller.

4. The method of claim 3 further comprising estimating the actual in-equipment downlink delay.

5. The method of claim 1 wherein the in-equipment downlink delay reported to the radio equipment controller is a maximum in-equipment downlink delay acceptable to the radio equipment controller.

6. The method of claim 1 wherein passing the synchronization message from the first interface of the radio equipment to the second interface of the radio equipment is such that the synchronization message is returned to the radio equipment controller.

7. The method of claim 6 wherein the first and second interfaces of the radio equipment are connected to the radio equipment controller via at least one cable.

8. The method of claim 6 wherein the first interface of the radio equipment is connected to an output interface of the radio equipment controller from which the synchronization message is received, and the second interface of the radio equipment is connected to an input interface of the radio equipment controller to which the synchronization message is returned.

9. The method of claim 8 wherein the synthetic delay appears to the radio equipment controller as part of a cable delay of a cable connecting the first interface of the radio equipment to the output interface of the radio equipment controller and connecting the second interface of the radio equipment to an input interface of the radio equipment controller.

10. The method of claim 1 wherein the synchronization message is a K28.5 sync byte in a Common Public Radio Interface basic frame.

11. A radio equipment connected to a radio equipment controller that together form at least part of a base station in a cellular communication network, comprising:
   a controller;
   a radio interface providing a wireless interface of the radio equipment; and
   a radio equipment controller interface that provides an interface to the radio equipment controller, the radio equipment controller interface adapted to:
      receive, at a first interface of the radio equipment controller interface, a synchronization message from the radio equipment controller, the first interface configured to receive data from the radio equipment controller;
      pass the synchronization message from the first interface of the radio equipment controller interface to a second interface of the radio equipment controller interface with a synthetic delay that is in addition to an in-equipment delay from the first interface to the second interface that is reported to the radio equipment controller, the second interface configured to send data to the radio equipment controller; and
      report, to the radio equipment controller via the radio equipment controller interface, an in-equipment downlink delay for the radio equipment that is less than an actual in-equipment downlink delay for the radio equipment;
   wherein the synthetic delay compensates for reporting the in-equipment downlink delay for the radio equipment that is less than the actual in-equipment downlink delay for the radio equipment.

12. The radio equipment of claim 11 wherein the synthetic delay artificially increases a total round-trip delay determined by the radio equipment controller based on the synchronization message.

13. The radio equipment of claim 11 wherein the synthetic delay is approximately equal to two times a difference between the actual in-equipment downlink delay for the radio equipment and the in-equipment downlink delay for the radio equipment reported to the radio equipment controller.

14. The radio equipment of claim 13 wherein the controller is further adapted to estimate the actual in-equipment downlink delay.

15. The radio equipment of claim 11 wherein the in-equipment downlink delay reported to the radio equipment controller is a maximum in-equipment downlink delay acceptable to the radio equipment controller.

16. The radio equipment of claim 11 wherein the radio equipment controller interface passes the synchronization message from the first interface to the second interface such that the synchronization message is returned to the radio equipment controller.

17. The radio equipment of claim 16 wherein the first and second interfaces of the radio equipment controller interface are connected to the radio equipment controller via at least one cable.

18. The radio equipment of claim 16 wherein the first interface of the radio equipment controller interface is connected to an output interface of the radio equipment controller from which the synchronization message is received, and the second interface of the radio equipment controller interface is connected to an input interface of the radio equipment controller to which the synchronization message is returned.

19. The radio equipment of claim 18 wherein the synthetic delay appears to the radio equipment controller as part of a cable delay of a cable connecting the first interface of the radio equipment to the output interface of the radio equipment controller and connecting the second interface of the radio equipment to an input interface of the radio equipment controller.

20. The radio equipment of claim 11 wherein the synchronization message is a K28.5 sync byte in a Common Public Radio Interface basic frame.

21. A radio equipment connected to a radio equipment controller that together form at least part of a base station in a cellular communication network, comprising:
   means for receiving, at a first interface of the radio equipment, a synchronization message from the radio equipment controller, the first interface configured to receive data from the radio equipment controller;
   means for passing the synchronization message from the first interface of the radio equipment to a second interface of the radio equipment with a synthetic delay that is in addition to an in-equipment delay from the first interface to the second interface that is reported to the radio equipment controller, the second interface configured to send data to the radio equipment controller; and
   means for reporting, to the radio equipment controller, an in-equipment downlink delay for the radio equipment that is less than an actual in-equipment downlink delay for the radio equipment;
   wherein the synthetic delay compensates for reporting the in-equipment downlink delay for the radio equipment that is less than the actual in-equipment downlink delay for the radio equipment.

* * * * *

UNITED STATES PATENT AND TRADEMARK OFFICE
CERTIFICATE OF CORRECTION

PATENT NO. : 9,036,544 B2
APPLICATION NO. : 13/281146
DATED : May 19, 2015
INVENTOR(S) : Johansson et al.

It is certified that error appears in the above-identified patent and that said Letters Patent is hereby corrected as shown below:

IN THE SPECIFICATION

In Column 6, Line 65, delete "$T_{a3\_REPORTED} < T_{a3\_ACTUAL}$." and insert -- $T_{a3\_REPORTED} = T_{a3\_ACTUAL}$. --, therefor.

In Column 7, Line 67, delete "$T_{14}\text{-}T_{12+}T_{OFFSET}+T_{SYNTHETIC\_DELAY}+T_{34}$." and insert -- $T_{14}=T_{12+}T_{OFFSET}+T_{SYNTHETIC\_DELAY}+T_{34}$. --, therefor.

In Column 8, Line 9, delete "REC 20" and insert -- REC 18 --, therefor.

Signed and Sealed this
Sixteenth Day of February, 2016

Michelle K. Lee
*Director of the United States Patent and Trademark Office*